Patented Sept. 12, 1950

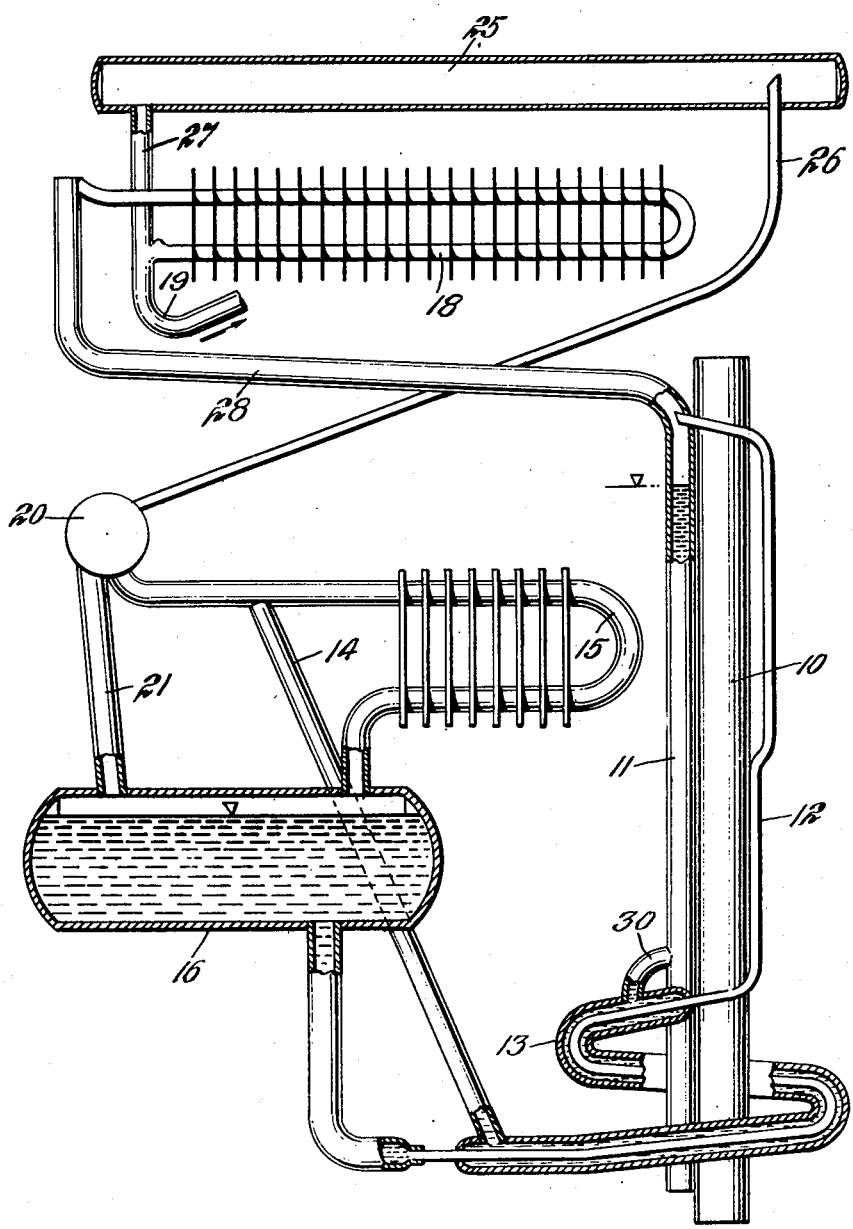

2,522,418

UNITED STATES PATENT OFFICE 2,522,418

METHOD OF MAKING ABSORPTION REFRIGERATORS

Nils Erik Widell, Stockholm, Sweden, assignor to Aktiebolaget Elektrolux, Stockholm, Sweden, a corporation of Sweden Application November 26, 1947, Serial No. 788,116
In Sweden April 26, 1944

11 Claims. (Cl. 62—119.5)

The invention relates to hermetically closed refrigerating apparatus, in which a vapour lift pump is arranged to circulate absorption solution and to a method of making such apparatus. The invention has for its object to promote the process of pumping in order to ensure the most convenient liquid circulation of the apparatus.

The invention, the essential characteristic feature of which consists in filling the apparatus with an absorption solution containing a substance, preferably sodium aluminate, that is dissolved, suspended or dispersed therein and possesses the property of influencing the surface tension of the liquid to promote an increase of the vapour bubbles formed in the liquid and of the vapour bubbles passing through the liquid, respectively.

The invention will be more fully explained with reference to the embodiment shown diagrammatically in the accompanying drawing, from which the characteristic features of the invention will be seen, and in which the single figure shows diagrammatically an absorption refrigerating apparatus operating with an inert gas in which the invention is applied.

In the drawing 10 designates a tube operating as a flue, to which another tube 11 is welded along a common generatrix. Below, the tube 11 is closed, whereas, above, it passes into a conduit 28 to the condenser 18 of the apparatus. The tube 11 serves as a boiler, and the vapours expelled are led through the conduit 28 to the condenser. The poor solution flows through a conduit 30, the outer jacket of the liquid heat exchanger 13 and the conduit 14 to the absorber 15 of the apparatus. The liquid circulation pump of the apparatus is designated by reference numeral 12 and is formed of a narrow tube, which, below, is a continuation of the inner tube of the heat exchanger 13 and, above, runs into the boiler tube 11, into which the rich solution is thus pumped. This solution is supplied through the inner tube of the heat exchanger 13 from the absorber vessel 15 of the apparatus. As already stated, the refrigerating apparatus shown in the drawing operates with an inert gas, which, in a manner known per se, circulates through the evaporator of the apparatus, not shown, as well as its gas heat exchanger designated by reference numeral 20, a conduit 21, the absorber vessel 16, the absorber 15, the heat exchanger 20, and finally the evaporator. The liquid refrigerant is supplied to the evaporator from the condenser 18 through a conduit 19 provided with a U-seal. Finally, a pressure vessel 25 of a kind known per se is, in the embodiment shown, connected by means of conduits 27 and 26 to the circulation system of the gas. Both the condenser 18 and absorber 15 may be aircooled and, if desired, provided with cooling fins.

As appears from the drawing, rich absorption solution enters the pump pipe 12 from the inner tube of the liquid heat exchanger. On account of the heat supplied to the lower section of the flue tube 10 and the heat conducting weld between the flue tube and the pump pipe 12, gas bubbles are formed in the latter. It has been mentioned above that the growth of the gas bubbles is influenced by the surface tension of the liquid, and the invention consists in charging the absorption solution, i. e. ammonia-water solution, with some quantities of substances that possess the property of influencing the surface tension in such a way that the increase of the vapour bubbles formed in the solution and of the vapour bubbles passing through the solution, respectively, is promoted.

Among substances having such properties, certain compounds of aluminium have proved especially effective. Thus, the pumping is quite favourably promoted in an absorption refrigerating apparatus made of iron and operating with a solution of ammonia in water and with hydrogen gas, if 0.1% sodium aluminate ($AlO_2Na$) and 0.1% sodium hydroxide ($NaOH$), both calculated for the quantity of pure water enclosed in the apparatus, are dissolved in the absorption solution. The quantities of aluminate and sodium hydroxide may be varied within certain limits, but generally they should not exceed about 3 to 5%.

The sodium aluminate seems to influence the surface tension of the solution, in the same way as washing chemicals of the inorganic type, so as to promote the forming of larger vapour bubbles.

The invention is not to be limited to the embodiment described above but may be varied within the spirit and scope of the invention. Especially with regard to the quantities of as well as the surface tension influencing substances, there prevails a certain liberty of adoption according to the size of the apparatus, the operating temperature and so on. Besides compounds of aluminium, especially alkali aluminate, also other substances with analogous properties as to the surface tension effect may be utilized.

Generally, it is favourable to select specifically inorganic substances, but if organic compounds, such as certain salts of sulphonacids are used with the characteristics of not being disintegrated at the highest actual operation temperature of the apparatus in question, also organic substances are useful.

I claim:

1. In the art of making an hermetically sealed absorption refrigeration apparatus in which circulation of liquid absorbent in its circuit is accomplished by lifting of liquid by vapor lift action, the improvement which comprises mixing with the absorbent before hermetically sealing the apparatus a substance, capable of penetrating all parts of the absorbent circuit in normal operation, which is dissolved, suspended or dispersed in the absorbent and possesses the property of influencing the surface tension of the liquid to promote an increase of the vapor bubbles formed in the liquid and also the vapor bubbles passing through the liquid, said substance comprising from about 0.1 to 5% sodium aluminate.

2. In the art of making an hermetically sealed absorption refrigeration apparatus in which circulation of liquid absorbent in its circuit is accomplished by lifting of liquid by vapor lift action, the improvement which comprises adding to the absorbent before hermetically sealing the apparatus a substance, capable of penetrating all parts of the absorbent circuit in normal operation, which possesses the property of influencing the surface tension of the liquid to promote enlargement of the vapor bubbles utilized to lift liquid by vapor lift action, said substance comprising from about 0.1 to 5% sodium aluminate and from about 0.1 to 5% of an alkali hydroxide.

3. In the art of making an hermetically sealed absorption refrigeration apparatus in which circulation of liquid absorbent is accomplished by lifting of liquid by vapor lift action, the improvement which comprises adding sufficient sodium aluminate to the absorbent before hermetically sealing the apparatus to promote lifting of liquid by vapor lift action when the apparatus is initially placed in operation.

4. In the art of making an hermetically sealed absorption refrigeration apparatus in which circulation of liquid absorbent is accomplished by lifting of liquid by vapor lift action, the improvement which comprises adding sufficient sodium aluminate and an alkali hydroxide to the absorbent before hermetically sealing the apparatus to promote lifting of liquid by vapor lift action.

5. In the art of making an hermetically sealed absorption refrigeration apparatus in which circulation of liquid absorbent is accomplished by lifting of liquid by vapor lift action, the improvement which comprises mixing with the absorbent before hermetically sealing the apparatus a substance including sodium aluminate and sodium hydroxide, such substance being dissolved, suspended or dispersed in the liquid in a sufficient amount to promote lifting of liquid by vapor lift action.

6. In the art of making an hermetically sealed absorption refrigeration apparatus utilizing ammonia as a refrigerant and water as an absorbent and in which circulation of absorbent is accomplished by lifting of liquid by vapor lift action, the improvement which comprises mixing with the absorbent before hermetically sealing the apparatus a substance including sodium aluminate which is dissolved, suspended or dispersed in the liquid in a sufficient amount to promote lifting of liquid by vapor lift action.

7. The improvement set forth in claim 6 in which said substance includes sodium hydroxide.

8. The improvement set forth in claim 6 in which about 0.1% of sodium aluminate is mixed with the liquid absorbent.

9. The improvement set forth in claim 6 in which said substance includes sodium hydroxide, approximately 0.1% of said sodium aluminate and 0.1% of such sodium hydroxide being mixed with the liquid absorbent.

10. An hermetically sealed absorption refrigeration apparatus having a circuit including a pump pipe for circulation of an aqueous liquid absorbent by vapor lift action, said liquid absorbent containing, before the apparatus is hermetically sealed and placed in operation, an inorganic substance which is capable of penetrating all parts of said circuit in normal operation of the apparatus and possesses the property of influencing the surface tension of the liquid to promote enlargement of the vapor bubbles for lifting liquid in said pump pipe by vapor lift action, said substance comprising approximately 1 gram of sodium aluminate per liter of water.

11. An hermetically sealed absorption refrigeration apparatus of the inert gas type having ammonia, water and hydrogen as the working media and including a circuit having a pump pipe for circulation of aqueous ammonia solution by vapor lift action, said liquid absorbent containing, before the apparatus is hermetically sealed and placed in operation, approximately 1 gram of sodium aluminate and 1 gram of sodium hydroxide per liter of water.

NILS ERIK WIDELL.

REFERENCES CITED

The following references are of record in the file of this patent:

UNITED STATES PATENTS

| Number | Name | Date |
|---|---|---|
| 1,679,440 | Munters | Aug. 7, 1928 |